US009403667B2

(12) United States Patent
McCabe et al.

(10) Patent No.: US 9,403,667 B2
(45) Date of Patent: Aug. 2, 2016

(54) DYNAMIC VIBRATION CONTROL SYSTEMS AND METHODS FOR INDUSTRIAL LIFT TRUCKS

(75) Inventors: Paul P. McCabe, Binghamton, NY (US); John B. Kirk, Greene, NY (US); Bryce Gregory, Port Crane, NY (US); Michael G. Field, Lansing, NY (US)

(73) Assignee: The Raymond Corporation, Greene, NY (US)

(*) Notice: Subject to any disclaimer, the term of this patent is extended or adjusted under 35 U.S.C. 154(b) by 1274 days.

(21) Appl. No.: 13/312,722

(22) Filed: Dec. 6, 2011

(65) Prior Publication Data

US 2012/0235100 A1  Sep. 20, 2012

Related U.S. Application Data

(60) Provisional application No. 61/454,188, filed on Mar. 18, 2011.

(51) Int. Cl.
| *B66F 9/075* | (2006.01) |
| *B60G 17/08* | (2006.01) |
| *B62B 3/06* | (2006.01) |
| *B62B 5/00* | (2006.01) |
| *B66F 17/00* | (2006.01) |
| *F16F 15/02* | (2006.01) |
| *F16F 7/01* | (2006.01) |

(52) U.S. Cl.
CPC ............ *B66F 9/07586* (2013.01); *B60G 17/08* (2013.01); *B62B 3/0612* (2013.01); *B62B 5/0006* (2013.01); *B62B 5/0069* (2013.01); *B66F 9/07559* (2013.01); *B66F 17/003* (2013.01); *F16F 7/01* (2013.01); *F16F 15/02* (2013.01); *B60G 2300/022* (2013.01); *B60G 2600/02* (2013.01); *B60G 2800/91* (2013.01); *B62B 2301/00* (2013.01); *F16F 2224/0283* (2013.01); *F16F 2224/045* (2013.01)

(58) Field of Classification Search
CPC ................. B66F 5/04; B66F 5/02; B66F 3/24
See application file for complete search history.

(56) References Cited

U.S. PATENT DOCUMENTS

| 2,982,395 A | 5/1961 | Rados |
| 3,031,024 A | 4/1962 | Ulinski |
| 3,067,839 A | 12/1962 | Gibson |
| 3,504,889 A | 4/1970 | Wyrough |

(Continued)

FOREIGN PATENT DOCUMENTS

| CN | 2889874 Y | 4/2007 |
| DE | 957377 C | 1/1957 |

(Continued)

OTHER PUBLICATIONS

Machine Translated JP 11-100200 A (Komatsu Forklift) Apr. 12, 1999.

(Continued)

*Primary Examiner* — Lee D Wilson
(74) *Attorney, Agent, or Firm* — Quarles & Brady LLP

(57) ABSTRACT

A lift truck includes systems and methods for improved vibration control. Vibration control features reduce or eliminate motion of the truck in one or more of the X-axis, Y-axis, and Z-axis. Some embodiments may include, alone or in combination with the vibration control, stability control to further stabilize the motion of the truck.

30 Claims, 6 Drawing Sheets

(56) References Cited

U.S. PATENT DOCUMENTS

| | | | |
|---|---|---|---|
| 3,672,634 A | 6/1972 | Chaffin | |
| 3,918,597 A | 11/1975 | Lee | |
| 4,037,739 A | 7/1977 | Lee | |
| 4,509,127 A | 4/1985 | Yuki et al. | |
| 4,530,492 A | 7/1985 | Bork | |
| 5,020,825 A | 6/1991 | Lizell | |
| 5,107,969 A | 4/1992 | Klein et al. | |
| 5,269,501 A | 12/1993 | Liegel et al. | |
| 5,289,902 A | 3/1994 | Fujita | |
| 5,338,015 A | 8/1994 | Liegel et al. | |
| 5,579,859 A | 12/1996 | Quellhorst et al. | |
| 5,628,377 A | 5/1997 | Le Gloan | |
| 5,647,600 A | 7/1997 | Booras | |
| 5,781,873 A | 7/1998 | Sasaki | |
| 5,853,181 A | 12/1998 | Booras | |
| 5,878,851 A | 3/1999 | Carlson et al. | |
| 5,993,358 A | 11/1999 | Gureghian et al. | |
| 6,226,558 B1 | 5/2001 | Schneider et al. | |
| 6,236,927 B1 | 5/2001 | Sherman | |
| 6,279,199 B1 | 8/2001 | Plate | |
| 6,499,184 B2 | 12/2002 | Plate | |
| 6,517,094 B1 | 2/2003 | Kincaid | |
| 6,601,825 B2 | 8/2003 | Bressner et al. | |
| 6,688,631 B1 | 2/2004 | Andre | |
| 6,847,874 B2 | 1/2005 | Stiller | |
| 7,008,166 B1 | 3/2006 | Grimes | |
| 7,017,228 B2 | 3/2006 | Silverstein et al. | |
| 7,070,028 B2 | 7/2006 | Reybrouck et al. | |
| 7,073,643 B2 | 7/2006 | Schel | |
| 7,121,372 B2 | 10/2006 | Braud | |
| 7,243,904 B1 | 7/2007 | Grimes | |
| 7,413,062 B2 | 8/2008 | Vandewal | |
| 7,593,797 B2 | 9/2009 | Izawa et al. | |
| 7,770,904 B2 | 8/2010 | Passeri | |
| 7,896,358 B2 | 3/2011 | Hoff | |
| 7,905,555 B2 | 3/2011 | Huntimer | |
| 8,140,228 B2 | 3/2012 | McCabe et al. | |
| 2006/0138733 A1 | 6/2006 | Clauson | |
| 2006/0182578 A1 | 8/2006 | Morton | |
| 2006/0231312 A1* | 10/2006 | Passeri | B62B 3/0612 180/211 |
| 2006/0232030 A1* | 10/2006 | Passeri | B62B 3/008 280/43.12 |
| 2007/0056141 A1 | 3/2007 | Armano et al. | |
| 2007/0199746 A1* | 8/2007 | Reid | B60K 1/04 180/65.31 |
| 2007/0231113 A1 | 10/2007 | McGurn | |
| 2008/0006494 A1 | 1/2008 | Vandewal | |
| 2009/0082925 A1 | 3/2009 | Wijffels et al. | |
| 2009/0166989 A1 | 7/2009 | Atsushi | |
| 2009/0312875 A1 | 12/2009 | Lehtonen et al. | |
| 2010/0230913 A1 | 9/2010 | Peterson | |
| 2011/0243699 A1 | 10/2011 | Kleeberger et al. | |
| 2012/0101627 A1 | 4/2012 | Lert | |
| 2012/0235100 A1* | 9/2012 | McCabe | B60G 17/08 254/2 R |
| 2012/0305867 A1* | 12/2012 | Luschi | B62B 3/0618 254/10 C |

FOREIGN PATENT DOCUMENTS

| | | | |
|---|---|---|---|
| DE | 19641192 | | 3/1998 |
| DE | 19641192 A1 | | 3/1998 |
| DE | 102004048519 | | 3/2006 |
| DE | 102005053264 | | 5/2007 |
| DE | 102008020595 | | 10/2009 |
| EP | 0890462 A1 | | 1/1999 |
| EP | 0921095 A2 | | 6/1999 |
| EP | 0931758 A1 | | 7/1999 |
| EP | 1172277 A2 | | 1/2002 |
| EP | 1588979 | | 10/2005 |
| EP | 1588979 A2 | | 10/2005 |
| EP | 1975114 | | 10/2008 |
| EP | 1975114 A1 | | 10/2008 |
| EP | 2022749 | | 2/2009 |
| EP | 2053013 A2 | | 4/2009 |
| EP | 2081822 | | 7/2009 |
| GB | 2379434 A | | 3/2003 |
| JP | 57160708 | | 10/1982 |
| JP | S58167214 A | | 10/1983 |
| JP | 06263145 | | 9/1994 |
| JP | 07315518 | | 12/1995 |
| JP | 09086610 | | 3/1997 |
| JP | 9145552 | | 6/1997 |
| JP | H11 100200 A | | 4/1999 |
| JP | 11301233 | | 11/1999 |
| JP | H11301233 A | | 11/1999 |
| JP | 2000 062428 A | | 2/2000 |
| JP | 2000 238999 A | | 9/2000 |
| JP | 2002370899 A | | 12/2002 |
| JP | 2004001941 A | | 1/2004 |
| JP | 2004269236 | | 9/2004 |
| JP | 2008081261 A | | 4/2008 |
| JP | 2008081261 A2 | | 4/2008 |
| WO | 2008006928 | | 1/2008 |

OTHER PUBLICATIONS

Machine Translated JP 2000-062428 A (Toyota Automatic Loom Works) Feb. 29, 2000.

"Active Sway Control cuts picking times down to size." http://www.ethiopianreview.com/articles/120808. Dated Nov. 4, 2010.

"Sway Control." http://www.hsmsearch.com/stories/articles/-/handling_storing/warehouse_safety/sway_control/. Dated Jun. 1, 2011.

"Rocla's new innovation brings more intelligence into warehouse trucks and improves user comfort." http://www.rocla.com/news.asp?Section=405&Item=5309. Dated 2012.

Zimmert, Nico et al. "Active Damping Control for Bending Oscillations of a Forklift Mast Using Flatness based Techniques." Journal Article. Dated Jun. 2010. American Control Conference. pp. 1538-1543.

Kullaa, Jyrki. "Active Control of a Mast Structure Using Support Excitation." European Congress on Computational Methods in Applied Sciences and Engineering. Dated Jul. 2004. pp. 1-14.

Minav, T.A. et al. "Electric energy recovery system efficiency in a hydraulic forklift." IEEE EUROCON, 2009: pp. 758-765.

Guang-zhao Cui et al. "A robust autonomous mobile forklift pallet recognition." 2nd International Asia Conference on Informatics in Control, Automation and Robotics (CAR). vol. 3, 2010: pp. 28+.

Keum-Shik Hong et al. "Navigation Function-Based Control of Multiple Wheeled Vehicles." IEEE Transactions on Industrial Electronics. vol. 58, Issue 5, 2011: pp. 1896-1906.

Hoefinghoff, J.-F. et al. "Using 3D Field Simulation for Evaluating UHF RFID Systems on Forklift Trucks." IEEE Transactions on Antennas and Propagation. vol. 59, Issue 2, 2011: pp. 689-691.

* cited by examiner

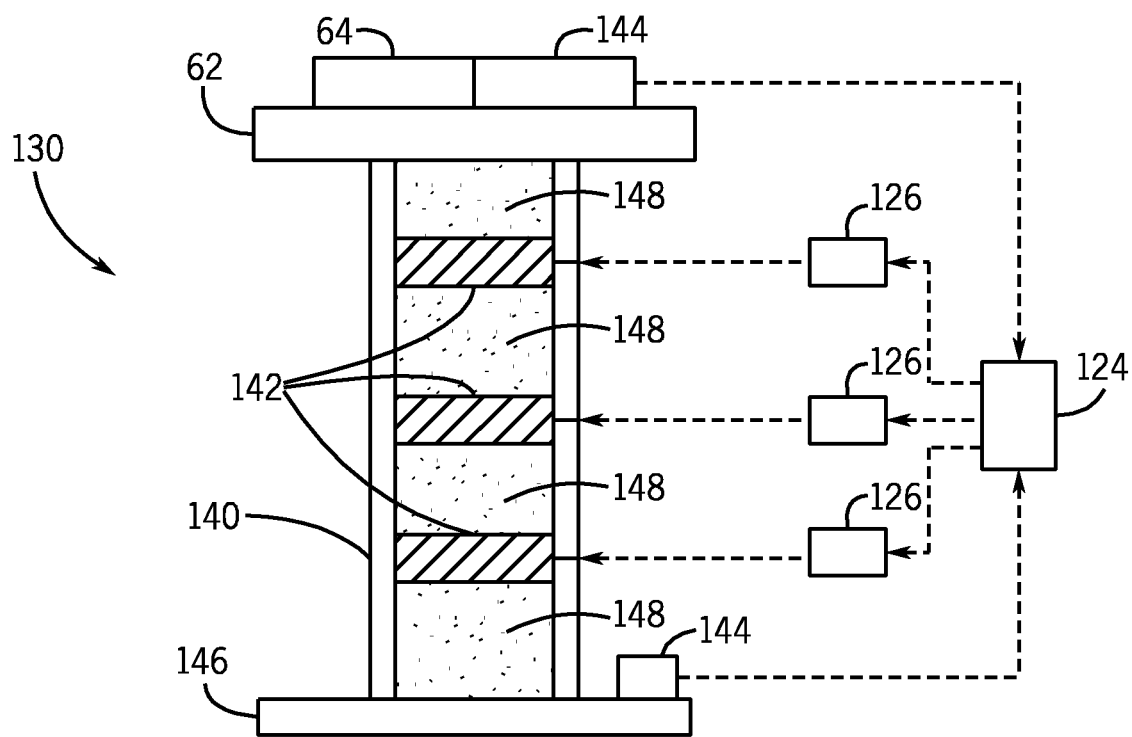

DYNAMIC VIBRATION CONTROL SYSTEMS AND METHODS FOR INDUSTRIAL LIFT TRUCKS

CROSS-REFERENCE TO RELATED APPLICATIONS

This application claims the benefit of U.S. Provisional Patent Application Ser. No. 61/454,188, filed Mar. 18, 2011, and entitled "Dynamic Stability Control Systems And Methods For Industrial Lift Trucks," which is hereby incorporated by reference.

STATEMENT CONCERNING FEDERALLY SPONSORED RESEARCH OR DEVELOPMENT

Not applicable.

FIELD OF THE INVENTION

The present invention relates to the field of industrial lift trucks, and more specifically to systems and methods for improved vibration control for lift trucks.

BACKGROUND OF THE INVENTION

Lift trucks are designed in a variety of configurations to perform a variety of tasks. A lift truck traveling throughout a facility may encounter debris on the floor and uneven floor surfaces. These can take the form of expansion joints, cracks in the floor surface or man-made objects such as ramps going between buildings or into tractor trailers. Tire irregularities and/or the floor can also cause periodic vibration that can be transmitted throughout the frame of the truck.

When a lift truck is traveling fast, one or more wheels strike an edge of the uneven surface harder than when the truck is traveling slowly. The energy from this motion is transmitted throughout the truck in the form of shock waves. Referring to FIG. 1, the resultant forces may be transmitted throughout a truck 10 in any of the three axes, including the X-axis 12, the Y-axis 14, and the Z-axis 16, and may be felt by the operator (not shown) creating a sense of discomfort. The truck 10 may include a tractor unit 17 and vertically movable forks 19 mounted relative to the tractor unit, the movable forks being vertically movable between an upper position and a lower position. If there is no operator, such as when the truck is being remotely controlled, the resultant forces may still have negative effects because equipment 18 on the truck may be rendered less effective. If there is equipment 18 on the truck, such as sensitive sensory equipment, the quality of the data from the equipment 18 may diminish because of the resultant forces and resultant truck reaction.

When a lift truck strikes a floor condition that affects only one side, such as when only one wheel, such as caster wheel 20, strikes a raised crack in the floor, and that side is forced up, the resultant motion is commonly called roll, and is shown as movement about the X-axis 12. The effect of roll causes the entire truck to temporarily move or tilt to one side (to the side of the truck with the wheel that did not strike the crack), and any sensory equipment mounted on the truck will also be directed to the same side. Equipment 18, such as a sensor mounted several feet away from the original point of movement, (the caster wheel 20), will have its reaction exaggerated. The sudden movement caused by the floor condition can diminish the effectiveness and/or accuracy of the sensory equipment and may necessitate that the truck be operated at slower speeds to reduce the effects of the floor conditions. Slower operating speeds may equate to an undesirable reduction in overall equipment productivity.

Referring to FIG. 2, a variety of lift truck configurations use spring loaded casters 24, including for example pallet trucks and stacker trucks, that have a center traction wheel 26 spaced between the two spring loaded casters 24. The spring loaded casters allow for driving over rough surfaces or floors 28 while still maintaining good contact force for the traction wheel 26. This contact force is important because acceleration, braking, and control are mainly achieved through the traction wheel, so the wheel 26 should maintain floor contact with enough force to control the truck motion. Typically, the casters are adjusted to find an optimum operation between traction wheel slippage and the truck rocking or tilting between both casters.

The casters 24 can be adjusted by adding shims 30 to push down harder on the floor, thus raising the truck slightly, or shims can be removed to make caster springs 32 push less, thus slightly lowering the truck. Typically, the caster springs 32 themselves are not adjusted. The purpose of the shim 30 is to set how much of the vehicle weight is on the traction wheel 26 versus how much is on the spring loaded casters 24. Without the flexible spring loaded casters and the ability to adjust the casters with shims, the casters may end up carrying most of the weight and the traction wheel may slip due to not enough contact force, or the traction wheel may take most of the weight, causing the truck to slightly tilt to one caster or the other.

Caster adjustment may be time consuming, and may include jacking up the truck, estimating how big a shim to install, and then seeing if the shim was too big or too little. In this configuration, there is no dynamic adjustment of the spring force while the truck is in motion.

Spring only casters can range from hard, with a high spring constant, to soft, with a low spring constant. A softer caster tolerates a rougher floor, but also lets the truck tilt on turns and shifts in the load or the operator position. A hard caster works well as long as the floor is completely flat. Conversely, the operator may sense rough floor conditions and objects on the floor, or cracks in the floor may effect the truck as the caster rolls over them.

Other varieties of lift truck configurations use spring loaded casters and include a known shock absorber 34 for damping. The addition of damping allows for softer springs, but still reduces the oscillation of rocking on a rough floor. Nevertheless, when one caster hits a large bump on the floor, the damper responds to the high speed motion of the caster by generating considerable force and may tilt the truck because the damper force is a function of caster motion, not truck roll. When the damper reacts in this way, it diminishes the advantages of softer springs.

Other varieties of lift truck configurations use a sway bar or torsion bar 36 between casters 24. Much like the spring and shock absorber configuration described above, with the inclusion of a torsion bar 36, the rough floor is averaged out so small random bumps don't tilt the truck. When tilting to one side, it automatically reduces the spring force on the other, which may stop the tilt. But also like the spring and shock absorber configuration, with a torsion bar, one caster hitting debris may raise the caster on the other side. On the contact side, the caster will push up while at the same time the caster on the other side is being pulled up by the torsion bar. So, in some cases, the torsion bar may actually induce a tilt in the truck.

Referring to FIG. 3, still other varieties of lift truck configurations use fixed casters 38 and a suspended traction wheel 40. This configuration lets the suspension springs 42 provide enough force to keep the traction wheel in contact with the floor, and is more prevalent with very flat floors. On rough floors, operators of a truck with this configuration are known to feel oscillations and the truck may tilt on most every bump. Also, the effect of hitting an object with one caster may cause a significant contact and tilt.

The prior methods suffer from not monitoring the orientation of the truck in one or more of the three axis of motion. For example, the casters only need to put out a force when the truck is moving away from horizontal, or roll, in the X-axis 12. If the truck is horizontal, or not changing quickly from horizontal, then the caster spring could be very soft. Yet, all these existing solutions respond to vertical motion of the caster wheel regardless of whether it is tilting the truck or not.

At best, the prior methods only improve the tradeoff between soft springs and the truck rolling versus hard springs and truck dampers that limit the performance of the spring only caster configurations. Another disadvantage of these previously used methods has been that the force or motion created is fixed. Even though variables like speed, mass and direction of motion are changing constantly as the truck is used, the compensating forces from a spring or shock are fixed, having been calculated from average or nominal values. Therefore only a narrow range of motion can be effectively addressed or mitigated.

If the motion of the caster wheel can be mitigated or even cancelled, the truck would then be capable of traveling faster without the potential damage to components or loss or degradation of truck data, along with a more comfortable ride for the operator. A more stable mounting platform for sensitive sensory components also improves the quality of data produced, allowing greater flexibility in the use of the truck in either automatic or manual modes.

What is needed is a lift truck configured to retain desirable features of flexible casters and yet to add more stability control to the lift truck.

SUMMARY OF THE INVENTION

The present invention overcomes the drawbacks of the previous lift truck systems and methods by providing additional vibration control features to reduce or eliminate motion of the truck in one or more of the X-axis, Y-axis, and Z-axis. Some embodiments may include, alone or in combination with the vibration control, stability control to further stabilize the motion of the truck.

In one aspect, the present invention provides a lift truck having vibration control. The lift truck comprises a tractor unit, with vertically movable forks mounted relative to the tractor unit, the forks being vertically movable between an upper position and a lower position. A vertical support is mounted relative to the tractor unit, and a platform is mounted relative to the vertical support, the platform for mounting electrical components. The vertical support comprises a hollow tube at least partially filled with a vibration damping material to damper vibrations from reaching the platform.

In one aspect, the present invention provides a method of reducing vibrations on a lift truck. The method comprises steps including providing a lift truck, the lift truck comprising a tractor unit and vertically movable forks mounted relative to the tractor unit, the forks being vertically movable between an upper position and a lower position. The steps also include providing a vertical support mounted relative to the tractor unit; providing a platform mounted relative to the vertical support, the platform for mounting electrical components; damping vibrations from reaching the platform with at least one of a vibration damping material in the vertical support and a mass-damper system; and providing control circuitry coupled to the at least one of the vibration damping material and the mass-damper system to control a degree of vibration damping.

The foregoing and other objects and advantages of the invention will appear in the detailed description which follows. In the description, reference is made to the accompanying drawings which illustrate preferred embodiments.

BRIEF DESCRIPTION OF THE DRAWINGS

FIG. 7 is a schematic drawing of a system for improving the stability of a lift truck by reducing the vibration in the lift truck.

The invention may be embodied in several forms without departing from its spirit or essential characteristics. The scope of the invention is defined in the appended claims, rather than in the specific description preceding them. All embodiments that fall within the meaning and range of equivalency of the claims are therefore intended to be embraced by the claims.

DETAILED DESCRIPTION OF THE PREFERRED EMBODIMENT

The various aspects of the invention will be described in connection with improved stability and vibration control of industrial lift trucks. That is because the features and advantages that arise due to embodiments of the invention are well suited to this purpose. Still, it should be appreciated that the various aspects of the invention can be applied to achieve other objectives as well.

Embodiments of the invention described herein, either alone or in combination, are well suited to provide a dynamically stabilized lift truck, including, for example, a dual-purpose fork lift truck that may be operated as an automated robotic vehicle and also as a standard manually operated truck. The truck achieves stabilization through one or more individual or combined improvements that are configured to effect motion in any one of three axes, and in some embodiments, plus reduce vibration. The collective improvements provide protection for sensitive electronic components, increase operator comfort, and allow greater productivity by permitting faster travel speeds.

In addition, features of the invention allow for the creation of a dynamically stable platform for mounting sensitive electronic components, such as sensors, controls, and position detecting/reporting equipment, which allows the components to be more effective, regardless of the floor conditions. The dynamically stabilized truck and platform allows the sensors and control equipment to generate better quality data, and to ensure more reliable operation. With better quality data, the truck may be allowed to travel faster due to more confidence in the accuracy of the data it produces. And, when the truck can travel faster and operate more reliably, the truck will likely generate more productivity.

The improved stability control systems and methods can be described as including a variety of unique features, where each feature can individually contribute to the improved stability of the truck in is own way, and each can be combined with one or more of the others to contribute to the improved stability of the truck in combination. Therefore, each of the unique features will be described separately below.

I. Active Roll and Pitch Control

Figure 1:
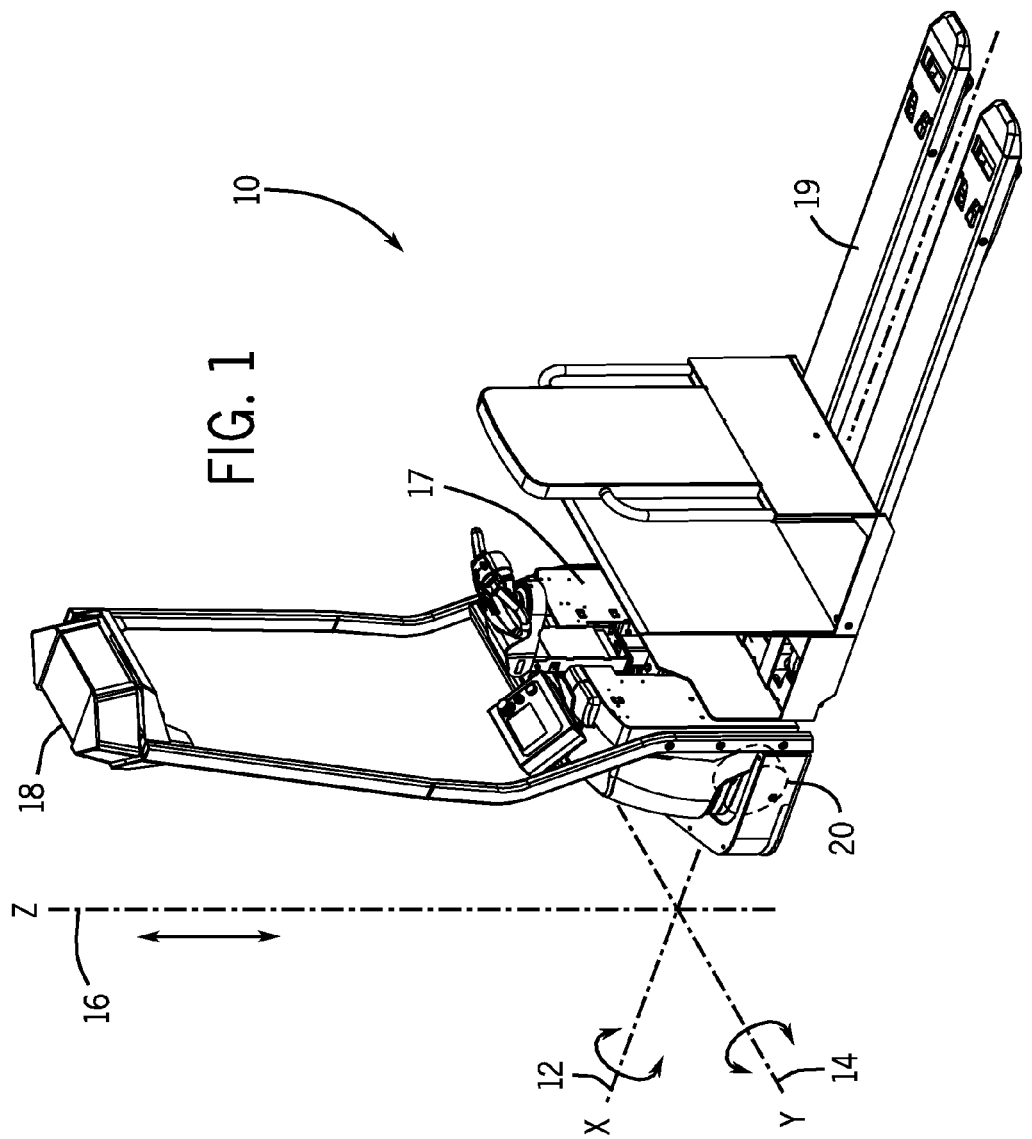
FIG. 1 is a perspective view of a lift truck showing three axis of possible motion.
Figure 2:
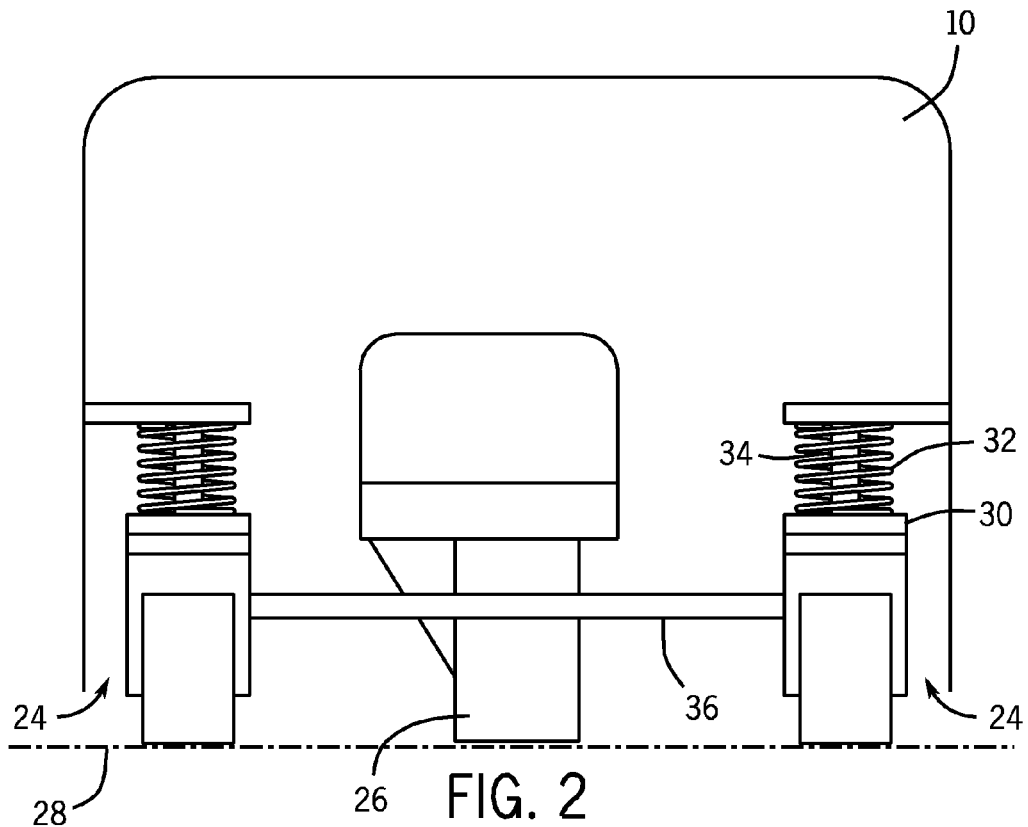
FIG. 2 is a rear view of a lift truck, showing known spring loaded caster configurations.
Figure 3:
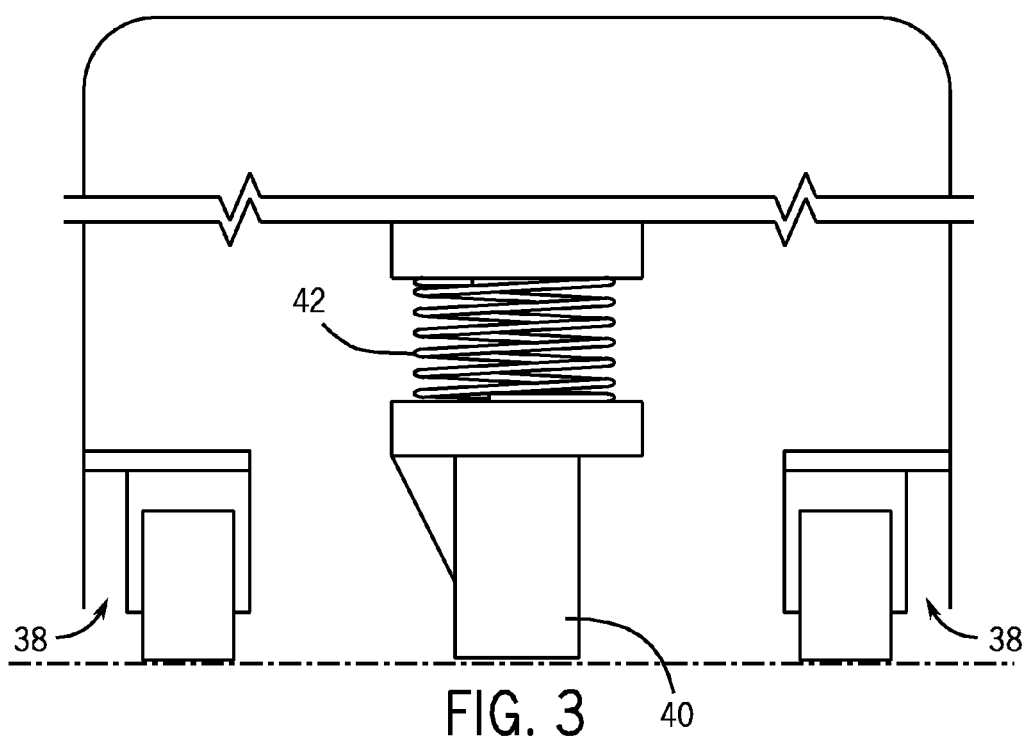
FIG. 3 is a rear view of a lift truck similar to the truck of FIG. 2, except showing a known fixed caster configuration with a suspended traction wheel.
Figure 4:
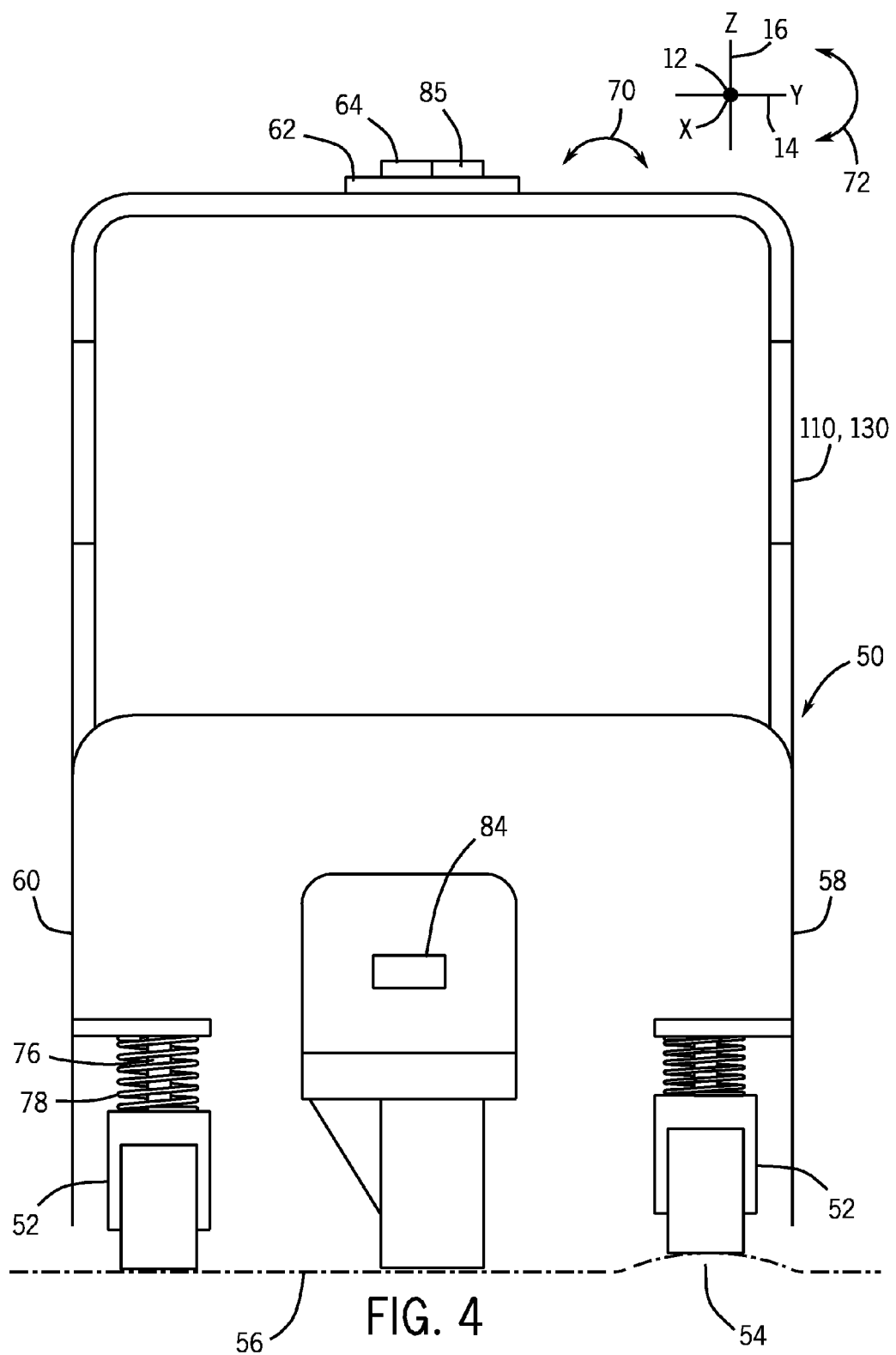
FIG. 4 is a rear view of a lift truck similar to the truck of FIG. 1, and including embodiments of the invention.

Referring to FIG. 4, when a lift truck 50 strikes a floor condition that affects only one side, such as when only one wheel, such as caster wheel 52, strikes a crack 54 in the floor 56, and side 58 of the truck 50 is forced up due to the motion, the resultant side to side motion is commonly called roll, and is shown as movement 70 about the X-axis 12. The effect of roll causes the entire truck to move or tilt to one side (the side 60 of the truck 50 with the wheel that did not strike the crack), and mechanical and/or electronic components 64 such as any sensory equipment mounted on a platform 62 will also be directed to the same side. The components 64, such as a sensor, mounted several feet away from the original point of movement, such as the caster wheel 52, will have its reaction exaggerated. The sudden movement caused by the floor condition can diminish the effectiveness of the electronic components and may cause the truck to be operated at slower speeds to reduce the effects of the floor conditions. Slower operating speeds may equate to an undesirable reduction in overall equipment productivity. Sudden movement at one or more wheels may result in an undesirable overall vehicle movement and can be detected and mitigated by actively controlling one or more of the resultant forces in any of the three axis, for example one or both of pitch (rotation or movement about the Y-axis) and roll of the truck.

As previously noted, prior methods suffer from not monitoring the orientation, e.g., pitch and/or roll of the truck. In an improved lift truck, the casters only need to provide a reactant force when the truck is moving away from horizontal in either pitch or roll. If the truck is horizontal, or not changing quickly from horizontal, then the caster spring could be very soft. Prior solutions respond to vertical motion of the caster wheel regardless of whether the vertical motion is tilting the truck or not.

Embodiments of the active roll and pitch control include a number of features:

1. Systems and methods measure the angular speed of rotation of the truck 50 around the X-axis 12, the Y-axis 14, and in the Z-axis 16. As discussed herein and as shown in FIG. 4, roll 70 is described as the movement, e.g., rotational speed, about the X-axis 12 in degrees per second, or dps. Similarly, pitch 72 is described as movement, e.g., the rotational speed, about the Y-axis 14. This angular speed of rotation around the X and Y-axis may be measured to provide a numerical value of the measured roll 70 and/or pitch 72.

2. When the roll 70 and/or pitch 72 of the truck 50 exceeds a predetermined threshold value, the systems and methods may be configured to "lock" one or more of the casters 52 to control the roll and/or pitch. In this context, "lock" means to stop the motion of the caster(s) in the Z-axis so it behaves like a fixed caster, or like a caster with an extremely hard spring. An actuator 76 locks the caster so it can act like a fixed caster. A locked caster may not expand or retract, or it would take great force to expand or retract, compared to an unlocked state. In one embodiment, the motion of the caster is locked suddenly, and in an alternative embodiment, the motion is locked over a predetermined amount of time. The motion of the casters may also be locked in relation to other factors, such as speed of the truck, or the weight of the truck or load, or the height of the load, or steering angle, or any combination.

3. After a predetermined duration of time, the casters may be unlocked. The predetermined duration of lock time for the locked casters may be a fixed duration, or, similar to locking the motion of the castors, it may be varied with vehicle speed and/or other factors. For example, at low speeds, the duration for locked casters may be longer than at high speeds. In one embodiment, at very low speeds, with the load raised, all the casters may be locked to create a temporary "fixed" caster truck configuration. Alternatively, the force on the left and right casters may be sensed, and the sensed force on each caster may be compared to determine when one or more of the casters could be unlocked.

Figure 5:
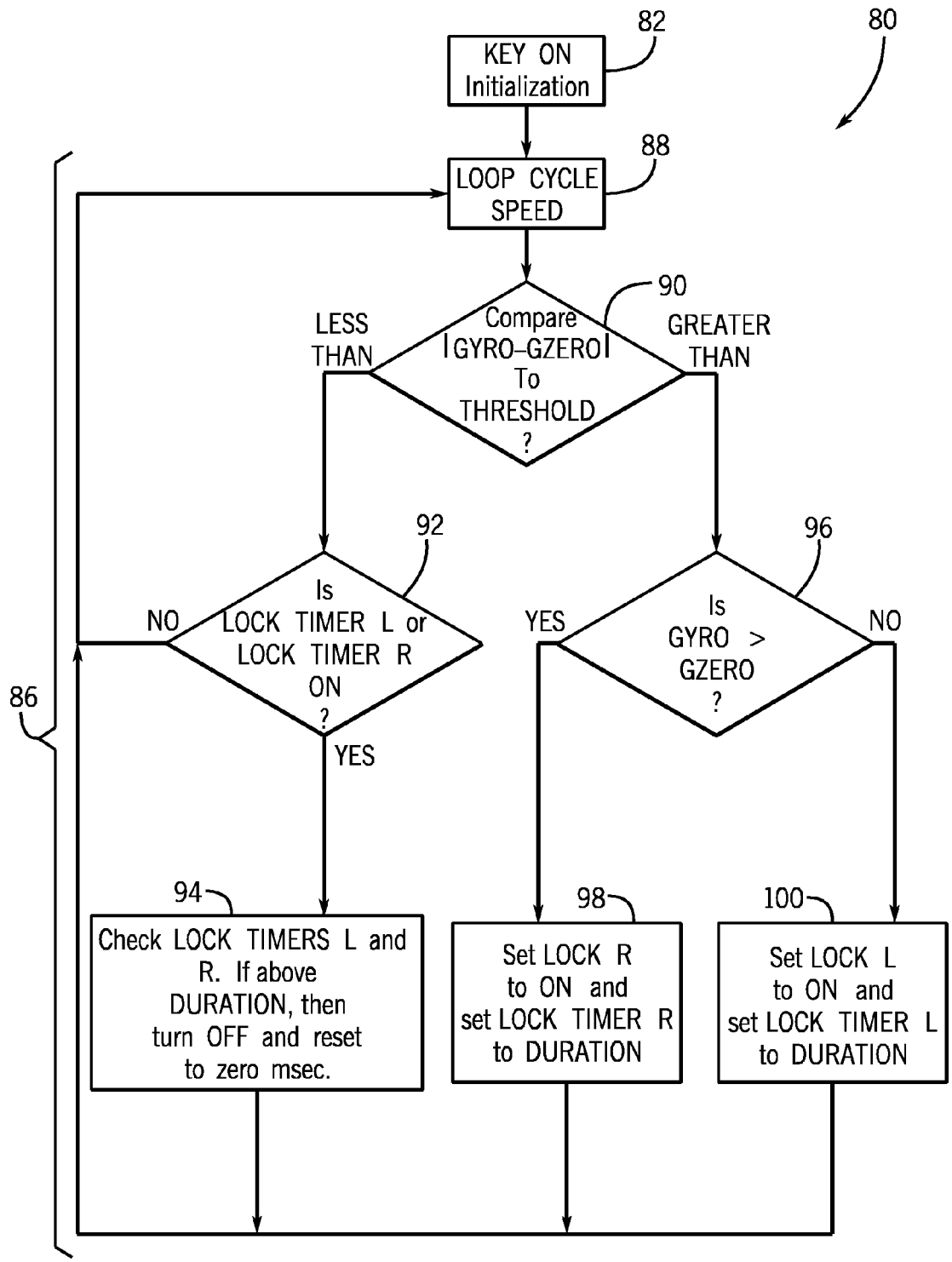
FIG. 5 is a flow chart of an algorithm according to an embodiment of the invention, the algorithm adapted to improve the stability of a lift truck.

Referring to FIG. 5, one embodiment of a method is shown for control of caster locking using feedback control of angular speed. It is to be appreciated that the systems and methods are adaptable for one or more of the resultant forces in any of the three axis to control, for example, either or both of pitch 72 and roll 70 together or individually, and can use feedback of any of the factors described above, or other factors that would be known to one of skill in the art.

The caster locking/unlocking algorithm 80 may start with an initialization process indicated as KEY ON at process block 82. At KEY ON, the algorithm checks and/or adjusts, i.e., calibrates a GZERO stationary value 81 that represents zero degrees per second or "dps" for a GYRO signal 83 received from a gyroscope 84 while the truck is stationary. A gyroscope is preferably positioned at or generally near an axis of rotation. Alternatively, one or more accelerometers 85 may be used and may be placed in other available locations on the truck. In this example, the GYRO signal 83 represents a roll 70, in dps, around the X-axis 12. When the gyroscope 84 sends a signal having a dps value greater than the value of GZERO, the truck is rolling (i.e., tilting) over to the right at GYRO-GZERO dps. Likewise, a GYRO signal 83 having a dps value smaller than GZERO indicates the truck is rolling (i.e., tilting) to the left at GZERO-GYRO dps. In some embodiments, the KEY ON initialization/calibration compensates for small shifts in the gyroscope sensor measurement.

In the embodiment shown, after the KEY ON initialization, the algorithm may run in a loop 86, as shown. First, at LOOP CYCLE SPEED process block 88, the algorithm waits a predetermined and possibly a fixed amount of time to control how fast the loop 86 runs. In one embodiment, a 10 millisecond wait time may be used, so, in this example, the loop cannot run faster than 100 times a second. This example LOOP CYCLE SPEED wait time may be used to give mechanical actuators time to change states. Without allowing a sufficient amount of time for mechanical actuators to change, the software may end up oscillating because it is able to change state faster than the truck is able to change its motion. The LOOP CYCLE SPEED wait time may generally be dependent on the truck design, the type of actuators used to lock up the casters, and other delays inherent or built into the system.

Next, at decision block 90, an absolute value of GYRO minus GZERO is compared to a THRESHOLD dps value. In one embodiment, the system may be configured to stop tilts (e.g., pitch and/or roll) with a dps value equal to or larger than the THRESHOLD dps value and not act upon smaller GYRO signals having a dps value less than or equal to the THRESHOLD value. During normal operation, there may be some minor pitches and/or rolls and the system may not react until the pitch or roll dps is at or exceeds THRESHOLD, typically where the GRYO signal is far from zero, although not a requirement. In a non-tilt example, if the GRYO signal is close to zero, (and not more than THRESHOLD), then the algorithm continues to decision block 92, where it may simply check any lock timers (e.g., LOCK TIMER L, LOCK TIMER R) to determine if they are ON, and if they are, the algorithm continues to decision block 94 to determine if any lock timers have been ON for a predetermined DURATION. If any timer is at or exceeds the DURATION, then the appropriate LOCK TIMER L or LOCK TIMER R may be turned OFF and reset, e.g., to zero msec. The loop 86 may then repeat by going back to process block 88, LOOP CYCLE SPEED. This permits a short predetermined period of time for the truck to respond.

In a tilt scenario, the truck will start to tilt, and the GYRO signal will shift away from GZERO by more than THRESHOLD. In this example, at decision block 96, the algorithm determines which way the truck is rolling by whether the GYRO signal is larger than GZERO or smaller than GZERO. Based on this determination, the algorithm branches to either the set LOCK R process block 98 or the set LOCK L process block 100, and locks up the caster on that side for the predetermined DURATION. The LOCK R (or LOCK L) is set to ON, and the LOCK TIMER R (or LOCK TIMER L) is set to DURATION. The truck is thereby prevented from rolling in that direction and should, after some time delay, cause the GYRO signal to return to GZERO or at least make the absolute value of GYRO minus GZERO less than THRESHOLD.

Note that embodiments of the invention may allow the truck to tilt slowly. An advantage of the systems and methods described herein is that a rapid roll to either side or oscillation (rocking around the roll axis) is stopped. For example, in one embodiment, a truck making a sudden turn may have the outside caster lock up to prevent rolling as the truck makes the turn. In another example, if a moving truck hits a bump on the right caster, the left caster may lock up to prevent rolling. But if the operator shifts the load and waits for several DURATION periods, then the truck may slowly lean toward the heavy side.

This slow tilt feature of the invention is useful and important. Useful because it lets the spring loaded casters adjust for wear so the traction tire always has good contact force with the floor. The traction tire may be the main source for control and braking, and it is important that the traction wheel maintain contact with the proper force against the floor surface.

After locking the appropriate side and starting the associated timer at process block 98 or process block 100, the algorithm repeats the loop 86 by going back to process block 88, CYCLE SPEED LIMIT. During the DURATION period, the actuator 76 locks the left or right side caster 52 so the caster acts like a fixed caster. In some embodiments, the actuator 76 could be a magneto-rheological (MR) fluid filled damper. One embodiment of an MR damper is able to lock up in about 20 milli-seconds, or more or less, while others are able to lock up in about 8 to 10 milli-seconds, or more or less, and stop the caster from compressing the caster spring 78. The caster may still have spring(s), but the springs could be soft so that a rough floor would not annoy the operator. The DURATION period is set long enough to account for most shocks or tilts due to sharp turns or other obstacles that would tilt a truck with soft or even hard springs. In one embodiment, a typical DURATION could range from about 0.1 seconds to about 5 seconds, or more or less, and may be predetermined in the algorithm for a particular truck design or truck application. In an alternative embodiment, the algorithm and associated system may be able to adjust the DURATION period for long durations at low speeds and shorter durations at high speeds. At high speeds, the truck would complete the turn, or roll over the bump in the floor, in a much shorter time than at low speeds.

Embodiments according to the invention provide several benefits and advantages that cannot be obtained in existing truck configurations. For example, embodiments of the invention enable the truck to stay level instead of rocking due to uneven floors. This is beneficial to the operator standing on the truck because a rocking truck may increase operator fatigue. In lifting loads onto or off of high racks or stacks, embodiments of the invention may lock both the left and right casters to make the mast more stable and stay vertical. Embodiments of the invention may also be more economical than fixed caster and floating traction wheel alternatives. Also, the ride quality may be much improved over fixed casters that typically transmit every bump into the platform the operator stands on. Embodiments of the invention will also allow use of very soft springs so the ride quality can be better than spring casters and spring-damper-caster designs. Notably, the invention detects and stops the pitch and/or roll while other known alternative designs do not detect the truck pitch or roll.

A variety of alternative embodiments are contemplated for the invention, and may be included individually or in any combination.

In some alterative embodiments, a variety of actuators 76 are contemplated for use with the invention. For example, small hydraulic cylinders with a rapid response profile are available. Also, solenoid based actuators could use an electromagnet to lock the caster into a fixed position. Pneumatic cylinders can be used to increase or decrease the force of the caster on the floor in parallel with springs, or in place of the mechanical springs. The MR actuator could act as a variable damper that increases the mechanical resistance based on the rotation speed (e.g., roll and/or pitch) instead of locking the caster solid. Hydraulic and pneumatic actuators can also act as sensors to detect caster compression and measure, or predict, the truck tilting. The hydraulic system could shut a valve to lock the caster, and the pneumatic system could open a valve to reduce pressure from a compressing caster or apply more pressure to extend a caster to exert more force on the floor. Additional materials, including piezoelectric composites and electroactive polymers, or EAPs, are also contemplated for actuator use. Piezoelectric composites can be used for both sensor and actuator functions. Piezoelectric materials can convert electrical signals into useful displacement or force. EAPs are polymers that exhibits a change in size or shape when stimulated by an electric field. A beneficial characteristic property of an EAP is that they are able to undergo a large amount of deformation while sustaining large forces.

In other alternative embodiments, a variety of different sensors are contemplated for use with embodiments of the invention. For example, a variety of gyroscope configurations are available, such as a solid state Micro-electromechanical Systems (MEMS) gyroscope. There are also several other types of gyroscope sensors or combinations of sensors that can replace a true gyroscope. In other embodiments, the rotation of the truck could be sensed by differential accelerometers, such as two Z-axis accelerometers with one mounted on each side of the truck. For rolls around the X-axis 12, the difference between the Z-axis 16 acceleration on the right and left side would indicate a roll is happening. Also, the tilt of the truck could be measured by mechanical devices used as sensors. The compression of the spring 78 for each caster 52 could be measured by any type of proximity sensor. By using geometry, the vertical location of one or more of the casters can be used to infer the truck tilt, or to predict that the truck will tilt due to unequal forces. In addition, hydraulic or pneumatic cylinders convert caster compression into a change in fluid pressure or fluid volume. Again, the vertical position of each caster, and the force it is exerting to tilt the truck, can be inferred from measuring the fluid pressure or fluid volume. For example, with a pneumatic cylinder, the contraction of the caster will increase the gas pressure. For a hydraulic cylinder, compression of the caster will force fluid out of the cylinder and into an expansion chamber. In addition to sensing or predicting truck tilt, these devices can also be used to lock the caster or apply force to stop the truck tilting.

Other alternative embodiments are adaptable for a variety of different applications. In one application having the suitable arrangement of lockable casters, the pitch around the Y-axis 14 can be controlled just as the roll around the X-axis 12. In a scenario where the operator is lifting a pallet high above the floor, the caster springs typically allow the truck mast to tilt, which is not desired. The tilting may make it more difficult to put the load on a shelf. One possible application for an embodiment of the invention would be to let the operator manually, or the truck software automatically, lock one or more of the casters while the load is some predetermined height above the floor. In this configuration, for example, for a short distance at low speeds, the truck could have fixed casters that would keep the mast from tilting.

In yet additional alternative embodiments, the invention may embody predictive control. For example, the truck may use power steering, a measured steering angle, or have limit switches that indicate the position of the steering controls. In these and other configurations, the truck software may anticipate the truck tilting due to steering position, truck speed, fork height above the floor, and/or other inputs from the operator. It is to be appreciated that the truck software could trigger a lock before the gyroscope 84 senses any tilt. And, the software described may release the lock after DURATION has passed (assuming the gyroscope senses no rotation larger than THRESHOLD).

Other embodiments may utilize stability control parameters that may be accessible on a local or remote computer system, such as a fleet management system, for example, to set or adjust one or more stability control parameters for a truck. Stability control parameters may be set or adjusted based on a variety of factors, such as type of truck, type of load, load weight, and/or the operator, as non-limiting examples. Stability measurements that monitor truck motion, such as data from accelerometers and gyroscopes, may also be passed on to the fleet management system. For example, the accelerometers can report impacts, and the gyroscopes may provide an indication that the truck casters need adjustment. This data may be recorded and available for analysis and display on a system monitor, for example.

Other embodiments may use a wide range of systems and methods to adjust the truck stability, and each may be used alone or in combination with other stability controls. Some embodiments may use a steered caster. In this configuration, the caster orientation may be monitored and controlled to maximize stability. In some other embodiments, a reduction in the permitted acceleration and speed of the truck could be used in combination with other systems and methods for stability control. For example, when a truck is turning, the casters may be locked to stop or reduce a roll. If that doesn't stop the roll, to a predetermined degree, then one or more factors affecting stability may be limited, such as the acceleration of the truck, and then another factor may be limited, such as speed of the truck, and so on, to reduce or stop the truck roll.

II. Z-Axis Control

Figure 6:
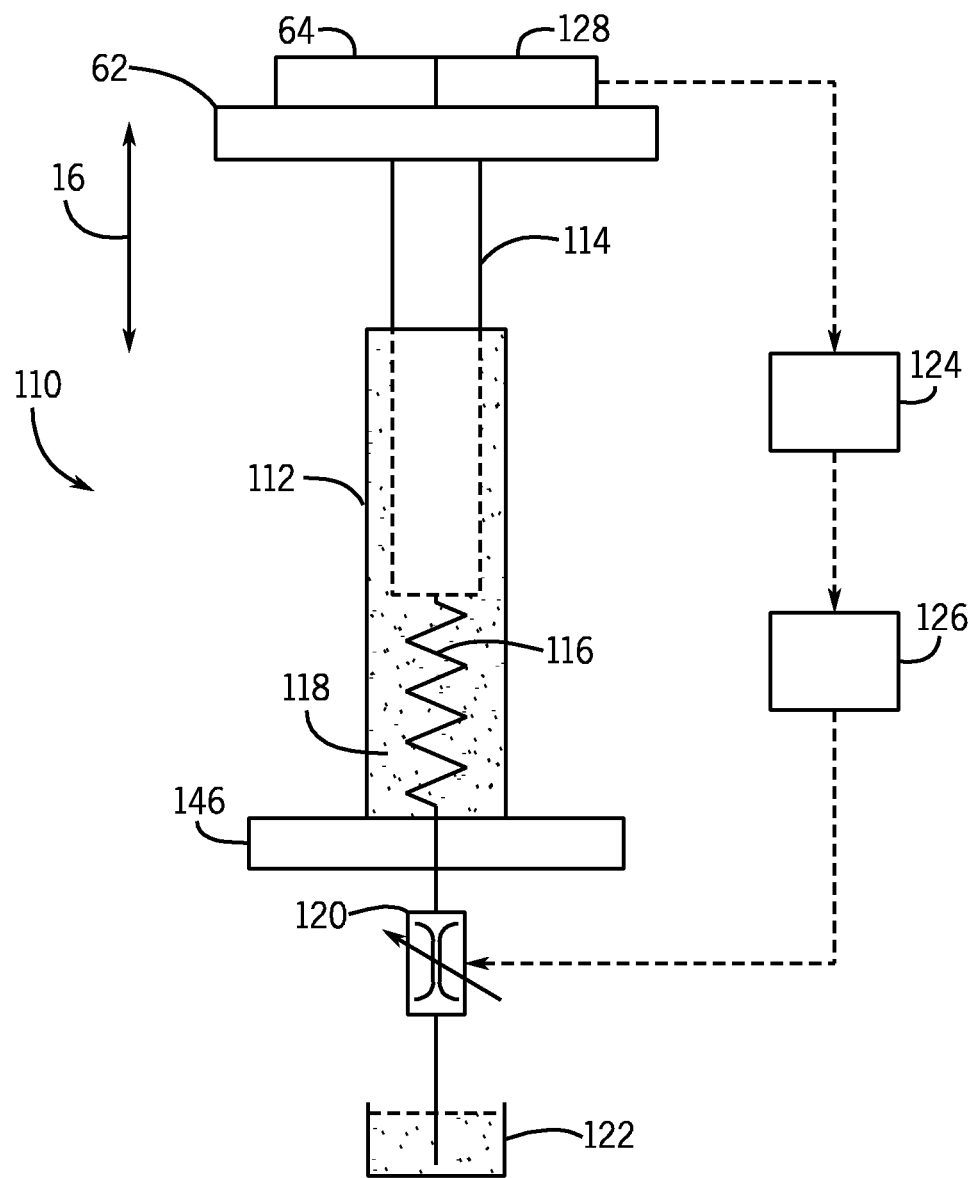
FIG. 6 is a schematic drawing of a system for improving the stability of a lift truck in the Z-axis according to an embodiment of the invention.

An additional aspect of the invention describes an embodiment of the invention where movement in the vertical direction, the Z-axis 16, may be controlled by dynamically suppressing movement of one or more vertical supports 110. Referring to FIGS. 4 and 6, a vertical support 110 according to an embodiment of the invention may be composed of two or more cylinders 112, 114 that function as a spring-mass-damper or tuned mass-damper system. Each vertical support may be constructed similar to a piston or hydraulic (pneumatic) cylinder and may be filled with a spring 116 and a fluid 118 (e.g., air, liquid). The fluid 118 may be ported to an orifice 120, such as a variable valve, and to a reservoir 122. The orifice 120 may be electrically controlled via a control circuit 124, which may optionally include an amplifier 126, to allow a variable amount of fluid motion. In one embodiment, an accelerometer 128 is used in the vertical axis (Z-axis 16) to detect movement with respect to time. Single and multi-axis models of accelerometers are available to detect magnitude and direction of the acceleration. If the acceleration is high, for example, as from a sudden shock to the truck when contacting a bump, the control circuit 124 may allow a fast fluid flow through the orifice providing cushioning, with the spring 116, to a portion of the vertical support, effectively serving as a shock absorber. If the acceleration rates are small, the fluid movement may be limited, thereby keeping the vertical movement minimal. This embodiment is well suited to provide a more stable platform 62 (see FIG. 4) for mounting components 64 on the vertical supports 110. If the detected motion from a shock can be mitigated or even cancelled, the truck may then be capable of traveling faster without the potential adverse effects to components, or loss or degradation of data. A more stable mounting platform for sensitive sensory components also improves the quality of data produced, allowing greater flexibility in the use of the vehicle in either automatic or manual modes.

III. Vibration Control

An additional aspect of the invention describes an embodiment of the invention including vibration control. Vibration can develop in most mechanical bodies during normal operation. While vibrations usually do not exhibit the same peak energy levels as the contact of an obstacle, it can cause other problems. Within a mechanical body, a vibration can cause small movements that occur at specific frequencies. In some cases, the mechanical structure, by virtue of its shape and mass, can develop resonances that may have the effect of creating oscillations.

Vibration from truck movement over a floor surface can travel throughout a frame of the truck and anything attached to it. Referring now to FIGS. 4 and 7, a vertical support 130 may be used for mounting the platform 62 and associated components 64. The support 130 may transmit vibrations experienced from truck motion through the support 130 and to the components 64. Damping the vibrations may be beneficial to the integrity of the sensor equipment and other components 64, and the quality of data produced. In one embodiment, construction of the vertical support 130 may use hollow tubing 140. The tubing 140 may contain one or more plugs or sections 142 partially or completely filled with, for example, a phase changing, energy absorbing material such as Magneto-rheological (MR) fluid. The smaller particles within the MR fluid can move with respect to each other and can dampen higher frequency vibration that the vertical support experiences. Piezoelectric materials and electroactive polymers, for example, are also considered for use in tubing 140. The phase changing material in the sections 142 may be electrically controlled via the control circuit 124, which may optionally include an amplifier 126, to allow a variable amount of phase change in the phase changing material.

An alternative embodiment describes an active vibration dampening system built into the support structure of the truck. In one embodiment, the system uses accelerometers 144 to detect vibration and movement both at the mounting frame base 146 and at the stabilized platform 62. Vibration frequencies that are detected in the mounting frame 146 may travel through the tubing 140 to the platform 62 if not acted upon. As described above, in one embodiment, a phase changing or variable viscosity material may be used, such as MR fluid, to change the shape of the resonant cavity in the support structure tubing 140, thereby dampening vibrations and/or any oscillations that start to occur. Because the truck may be moving with different speeds and with different loads, the mass and dynamic conditions are likely to be constantly changing. The active control is able to occasionally or continuously change the resonant characteristics of the support structure and prevent vibrations from becoming parasitic oscillations that may cause unwanted results.

In alternative embodiments, the tubing material 140 that the vertical support 130 is made from can be filled with one or more granular or pelletized materials 148, such as metal shot, plastic beads, or sand, as non-limiting examples. The ability of the particles to move against each other may help dissipate the higher frequency vibration energy and reduce and resultant undesirable motion. It is to be appreciated that the vertical support 130 can be mounted anywhere on the truck 50. It is also to be appreciated that any of the above embodiments can be combined to provide vibration control.

The foregoing has been a detailed description of illustrative embodiments of the invention. Various modifications and additions can be made without departing from the spirit and scope thereof. Furthermore, since numerous modifications and changes will readily occur to those skilled in the art, it is not desired to limit the invention to the exact construction and operation shown and described. For example, any of the various features described herein can be combined with some or all of the other features described herein according to alternate embodiments. While the preferred embodiment has been described, the details may be changed without departing from the invention, which is defined by the claims.

Finally, it is expressly contemplated that any of the processes or steps described herein may be combined, eliminated, or reordered. In other embodiments, instructions may reside in computer readable medium wherein those instructions are executed by a processor to perform one or more of processes or steps described herein. As such, it is expressly contemplated that any of the processes or steps described herein can be implemented as hardware, software, including program instructions executing on a computer, or a combination of hardware and software. Accordingly, this description is meant to be taken only by way of example, and not to otherwise limit the scope of this invention.

We claim:

1. A lift truck having vibration control, the lift truck comprising:
   a tractor unit;
   vertically movable forks mounted relative to the tractor unit, the forks being vertically movable between an upper position and a lower position;
   a vertical support mounted relative to the tractor unit, and a platform mounted relative to the vertical support, the platform for mounting electrical components;
   a first sensor to provide a first value of motion of the lift truck in at least one of an X-axis and a Y-axis and a Z-axis; and
   the vertical support comprising a hollow tube at least partially filled with a vibration damping material to damper vibrations from reaching the platform.

2. The lift truck as set forth in claim 1 wherein the first sensor comprises a first accelerometer.

3. The lift truck as set forth in claim 2 wherein the first accelerometer is mounted relative to the platform.

4. The lift truck as set forth in claim 1 further including a second sensor to provide a second value of motion of the lift truck in at least one of the X-axis and the Y-axis and the Z-axis.

5. The lift truck as set forth in claim 4 wherein the second sensor comprises a second accelerometer.

6. The lift truck as set forth in claim 5 wherein the second accelerometer is mounted relative to the tractor unit.

7. The lift truck as set forth in claim 1 wherein the hollow tube includes at least one hollow portion separated by a damper section, the damper section containing the vibration damping material.

8. The lift truck as set forth in claim 7 wherein the vibration damping material comprises at least one of a magneto-rheological fluid, a piezoelectric material, an electroactive polymer, and a granular material.

9. The lift truck as set forth in claim 7 wherein the at least one hollow section contains a granular material.

10. The lift truck as set forth in claim 1 further including a mounting frame base, the vertical support mounted relative to the mounting frame base.

11. The lift truck as set forth in claim 4 further including control circuitry coupled to at least one of the first and second sensors and the vibration damping material to control a degree of vibration damping.

12. The lift truck as set forth in claim 11 wherein the vibration damping material is a phase changing material.

13. The lift truck as set forth in claim 11 further including at least one caster mounted relative to the tractor unit; and
   an actuator to lock movement of the caster on a side of the lift truck based on a direction that the control circuitry determined the lift truck to be moving.

14. A lift truck having vibration control, the lift truck comprising:
   a tractor unit;
   vertically movable forks mounted relative to the tractor unit, the forks being vertically movable between an upper position and a lower position;
   a vertical support mounted relative to the tractor unit, and a platform mounted relative to the vertical support, the platform for mounting electrical components;
   the vertical support comprising two or more cylinders that function as a mass-damper system to damper vibrations from reaching the platform, the mass-damper system include a spring, a fluid, and a variable valve; and
   control circuitry coupled to the variable valve, the control circuitry to control a flow of the fluid through the variable valve to control a degree of vibration damping.

15. The lift truck as set forth in claim 14 further including a sensor coupled to the control circuitry, the sensor to provide a value of motion of the lift truck in at least one of an X-axis and a Y-axis and a Z-axis.

16. The lift truck as set forth in claim 15 wherein the sensor comprises an accelerometer.

17. The lift truck as set forth in claim 16 wherein the accelerometer is mounted relative to the platform.

18. The lift truck as set forth in claim 15 wherein the value of motion provided by the sensor is used to control the flow of fluid through the variable valve.

19. The lift truck as set forth in claim 14 further including at least one caster mounted relative to the tractor unit; and
   an actuator to lock movement of the caster on a side of the lift truck based on a direction that the sensor determined the lift truck to be moving.

20. The lift truck as set forth in claim 14 wherein the platform includes positioning equipment.

21. The lift truck as set forth in claim 14 further including a second sensor to provide a second value of motion of the lift truck in at least one of the X-axis and the Y-axis and the Z-axis.

22. The lift truck as set forth in claim 21 wherein the second sensor comprises a second accelerometer.

23. The lift truck as set forth in claim 22 wherein the second accelerometer is mounted relative to the tractor unit.

24. The lift truck as set forth in claim 21 wherein the vertical support further comprises a hollow tube at least partially filled with a vibration damping material to damper vibrations from reaching the platform.

25. The lift truck as set forth in claim 24 wherein the hollow tube includes at least one hollow portion separated by a damper section, the damper section containing the vibration damping material.

26. The lift truck as set forth in claim 25 wherein the vibration damping material comprises at least one of a magneto-rheological fluid, a piezoelectric material, an electroactive polymer, and a granular material.

27. The lift truck as set forth in claim 25 wherein the at least one hollow section contains a granular material.

28. The lift truck as set forth in claim 24 wherein the control circuitry is further coupled to at least one of the first and second sensors and the vibration damping material to control the degree of vibration damping.

29. A lift truck having vibration control, the lift truck comprising:
   a tractor unit;
   vertically movable forks mounted relative to the tractor unit, the forks being vertically movable between an upper position and a lower position;
   a vertical support mounted relative to the tractor unit, and a platform mounted relative to the vertical support, the platform for mounting electrical components;
   a first sensor to provide a first value of motion of the lift truck in at least one of an X-axis and a Y-axis and a Z-axis;
   the first sensor being an accelerometer mounted relative to the platform;
   the vertical support comprising a hollow tube at least partially filled with a vibration damping material to damper vibrations from reaching the platform, the hollow tube including at least one hollow portion separated by a damper section, the damper section containing the vibration damping material; and
   the vibration material comprises at least one of a magneto-rheological fluid, a piezoelectric material, an electroactive polymer, and a granular material.

30. A lift truck having vibration control, the lift truck comprising:
   a tractor unit;
   vertically movable forks mounted relative to the tractor unit, the forks being vertically movable between an upper position and a lower position;
   a vertical support mounted to the tractor unit, the vertical support including a first vertical support arm and a second vertical support arm;
   a platform mounted on a horizontal support that is mounted between the first vertical support arm and the second vertical support arm, the platform for mounting electrical components;
   at least one of the first vertical support arm and the second vertical support arm comprising two or more cylinders that function as a mass-damper system to damper vibrations from reaching the platform, the mass-damper system include a spring, a fluid, and a variable valve;
   control circuitry coupled to the variable valve, the control circuitry to control a flow of the fluid through the variable valve to control a degree of vibration damping;
   a first sensor coupled to the control circuitry, the first sensor to provide a value of motion of the lift truck in at least one of an X-axis and a Y-axis and a Z-axis; and
   a second sensor coupled to the control circuitry, the sensor to provide a second value of motion of the lift truck in the at least one of the X-axis and the Y-axis and the Z-axis.

* * * * *